March 27, 1928.
R. E. NAYLON
CHUCK
Filed Oct. 22, 1924
1,664,085
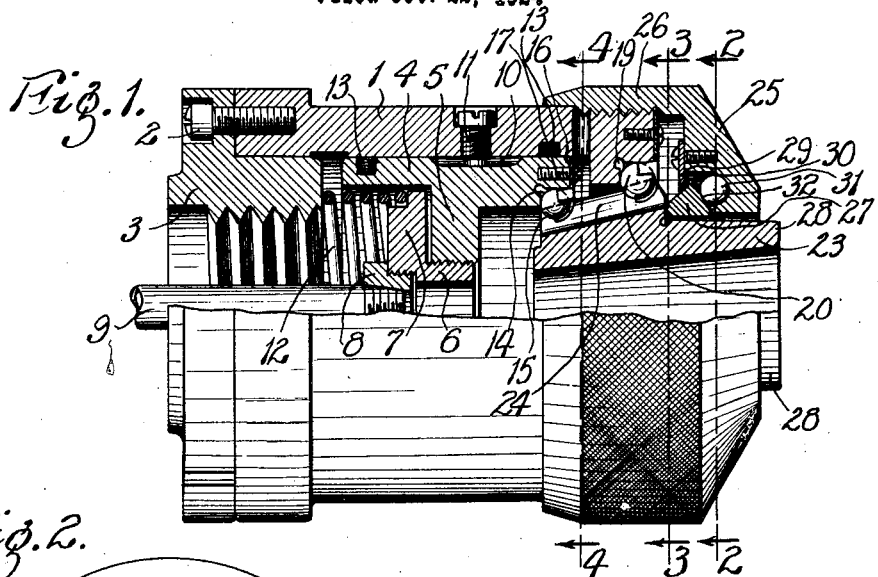
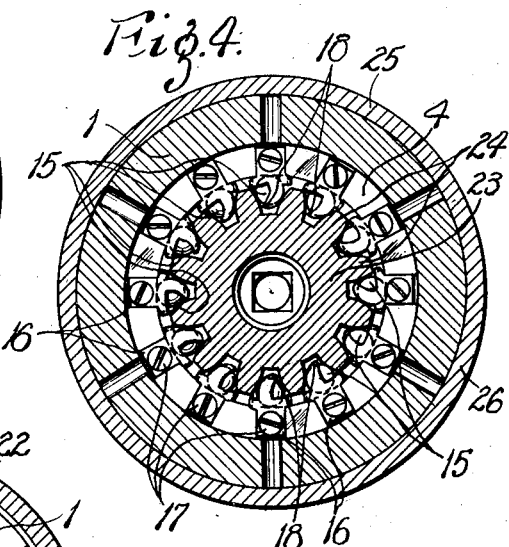
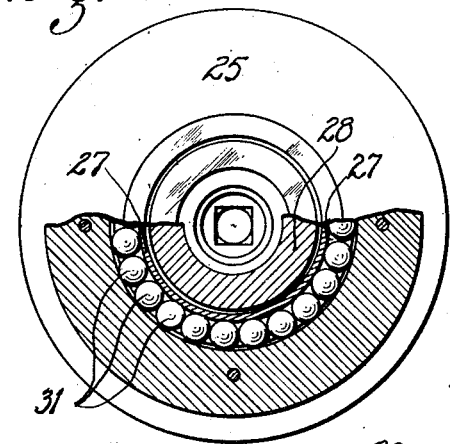
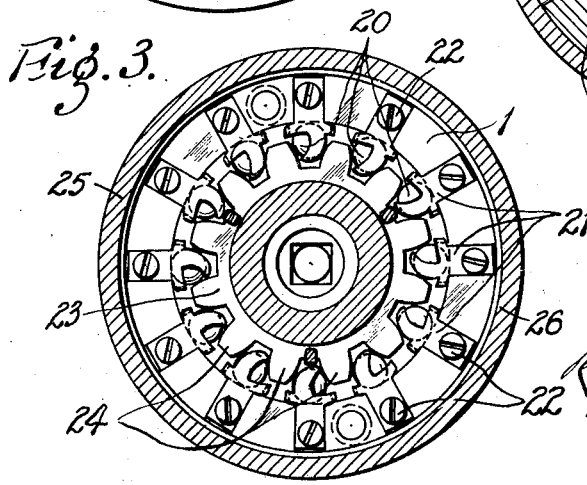
INVENTOR:
Robert E. Naylon
by Cavent Cavin
his ATTORNEYS.

Patented Mar. 27, 1928.

1,664,085

UNITED STATES PATENT OFFICE.

ROBERT E. NAYLON, OF DETROIT, MICHIGAN, ASSIGNOR TO THE TIMKEN-DETROIT AXLE COMPANY, OF DETROIT, MICHIGAN, A CORPORATION OF MICHIGAN.

CHUCK.

Application filed October 22, 1924. Serial No. 745,066.

My invention relates to chucks, particularly to ball chucks adapted to hold pinions or gears on their outer surface while the inner surface thereof is being ground or subjected to other operations; and has for its principal objects a device that will accurately hold a pinion in position, that is able to accommodate pinions having teeth of various inclinations and that is capable of compensating for slight irregularities in the work and of being properly adjusted to the work.

The invention consists principally in a ball chuck having a series of balls mounted so as to be adapted to fit in the spaces between the toes of the pinion teeth, another series of balls mounted so as to be disposed in the spaces between the heels of the pinion teeth, the mounting member of one series of balls being permitted movement relative to the other and a compensating washer provided with means for forcing it against the pinion to position said pinion firmly against the balls of the chuck. The invention further consists in the chuck and in the parts and combinations of parts hereinafter described and claimed.

In the accompanying drawing, which forms part of this specification and wherein like reference numerals indicate like parts wherever they occur, Fig. 1 is a part elevation, part longitudinal section of a chuck embodying my invention, Fig. 2 is a sectional view on the line 2—2 of Fig. 1, looking in the direction of the arrows, Fig. 3 is a cross sectional view on the line 3—3 of Fig. 1 looking in the direction of the arrows, and Fig. 4 is a cross sectional view on the line 4—4 of Fig. 1 looking in the direction of the arrows.

A tubular outer body member 1 is secured as by screws 2 to an interiorly threaded ring 3 that is adapted to be mounted on the spindle of a grinding or other machine (not shown in the drawing). Mounted in said tubular body member 1 is a cylindrical inner body member 4 that is provided with a central inwardly disposed annular rib portion 5. Threaded into said rib portion 5 is a ring 6 that has an enlarged flanged end portion 7. A hollow thimble 8 is threaded into said ring and a pipe 9 is threaded into said thimble, said pipe permitting escape of dust and lubricant from the chuck.

The cylindrical inner member 4 is provided with an enlarged recess 10 into which extends a screw 11 that is mounted in the outer body member 1, whereby the inner member 4 is permitted a limited longitudinal and rotary movement with respect to the outer body member. Interposed between the mounting ring 3 and the flanged portion 7 of the ring 6 is a spring 12 that tends to keep the inner member 4 in its outermost position in said outer body member 1. Preferably packing rings 13 are provided at the ends of the inner member.

The outer end of the inner member 4 is recessed, so as to produce seats 14 for a series of balls 15. Each of the balls 15 is held in position by means of a finger 16 of spring metal that is secured to the inner member as by a screw 17. Each finger 16 has a prong 18 that extends around a ball to hold it in position against the seats 14.

The outer end of the outer body member 1 is likewise recessed to form seats 19 for balls 20. Each ball 20 is held in position by a spring finger 21 similar to the fingers 16 above described, said fingers 21 being secured to the body member 1 as by screws 22.

The work, as a pinion 23, is mounted in the bores of the outer body member 1 and the inner member 4, the balls 15 and 20 of said two members fitting in the spaces between the teeth 24 of the pinion.

In order to hold the pinion 23 in position, a hollow cap member 25 has a tubular portion 26 that is threaded onto the end of the outer body member 1. Mounted in said cap 25 is a washer 27 that is adapted to fit over the hub or stem portion 28 of a pinion 23 and abut against the ends of the teeth of the pinion. Said washer 27 is held in a recess in the cap 25 by means of a retaining ring 29 that is secured to the cap and has a portion overlapping a projecting annular rib 30 of the washer 27. The cap is provided with an annular recess in which a series of balls 31 are mounted, said balls abutting against a surface 32 of the washer 27, said surface being preferably made spherical.

After a pinion has been positioned in the outer body member 1, the cap 25 is screwed onto the outer body member, thus forcing the washer 27 against the ends of the pinion teeth and forcing said pinion 23 into the outer body member, the end of the pinion extending into the inner member 4. The inner member 4 moves in the outer body member 1 to accommodate itself to the teeth of the pinion; and the washer 27 is likewise permitted to yield slightly to accommodate itself to the pinion by reason of its being held by the balls 31 that engage the spherically curved end edge 32 of the washer.

The above described chuck has numerous advantages. The pinion is firmly held and properly positioned. The chuck is free to accommodate itself to pinions having teeth of different angles and also to accommodate itself to any slight irregularities or variations in size of the work. The balls hold the work firmly but are free to yield when required. Obviously numerous changes may be made without departing from the invention. I do not wish to be limited to the precise construction shown.

What I claim is:

1. A chuck for holding conical articles, comprising a hollow outer body member, an inner body member therein, the ends of said members being spaced apart endwise, clamping means mounted at the end of said outer body member, clamping means mounted at the end of said inner body member, said clamping means being adapted and arranged to engage the conical work, and means for holding the work against said clamping means, said means comprising a cap threaded onto the end of said outer body member, an annular washer in said cap adapted to bear against the work, and a series of balls interposed between said cap and said washer.

2. A chuck for holding toothed articles comprising inner and outer members provided with means that are adapted to be disposed between the teeth of the work, a cap threaded onto said outer member, an annular washer mounted in said cap and adapted to engage the work to hold it in position, and a circular series of balls mounted in said cap and engaging the end of said washer.

3. A chuck for holding toothed articles comprising inner and outer members provided with means that are adapted to be disposed between the teeth of the work, a cap having a tubular portion threaded onto said outer member, an annular washer entirely disposed in an annular recess in the head of said cap and adapted to engage the work to hold it in position, said washer having an annular rib, a ring secured to said cap and overlapping said rib to prevent said washer from dropping out of said cap, and a circular series of balls interposed between the head of the cap and a surface of the washer.

4. A chuck for holding toothed articles comprising inner and outer members provided with means that are adapted to be disposed between the teeth of the work, a cap having a tubular portion threaded onto said outer member, an annular washer disposed in a recess in the head of said cap and adapted to engage the work to hold it in position, said washer having an annular rib, a ring secured to said cap and overlapping said rib to prevent said washer from dropping out of said cap, and a circular series of balls interposed between the head of the cap and one end surface of the washer, said end having a transverse spherical curvature.

Signed at Detroit, Michigan, this 10 day of Oct., 1924.

ROBERT E. NAYLON.